(12) United States Patent
Maher

(10) Patent No.: US 6,244,706 B1
(45) Date of Patent: Jun. 12, 2001

(54) ASSEMBLY FOR ATTACHING SUNGLASSES TO A CAP

(76) Inventor: Thomas Henry Maher, 33 N. Oaks Rd., North Oaks, MN (US) 55127

(*) Notice: Subject to any disclaimer, the term of this patent is extended or adjusted under 35 U.S.C. 154(b) by 0 days.

(21) Appl. No.: 09/610,201

(22) Filed: Jul. 3, 2000

(51) Int. Cl.⁷ .................................................... G02C 3/00
(52) U.S. Cl. .............................. 351/155; 351/158; 2/10; 2/15
(58) Field of Search ........................... 351/158, 41, 155; 2/199, 10, 15

(56) References Cited

U.S. PATENT DOCUMENTS 5,987,640 * 11/1999 Ryder .................................. 351/155

* cited by examiner

Primary Examiner—Hung Xuan Dang
(74) Attorney, Agent, or Firm—Thomas B. Tate

(57) ABSTRACT

An assembly for removably and adjustably attaching sunglasses to a cap. The assembly includes a flat base which attaches to a cap, a pair of sunglass lenses, and a hinging device connecting the lenses to the base. The assembly allows the lenses to be flipped up under the bill of the cap, to be flipped down for use, or to be adjusted to any intermediate position.

4 Claims, 1 Drawing Sheet

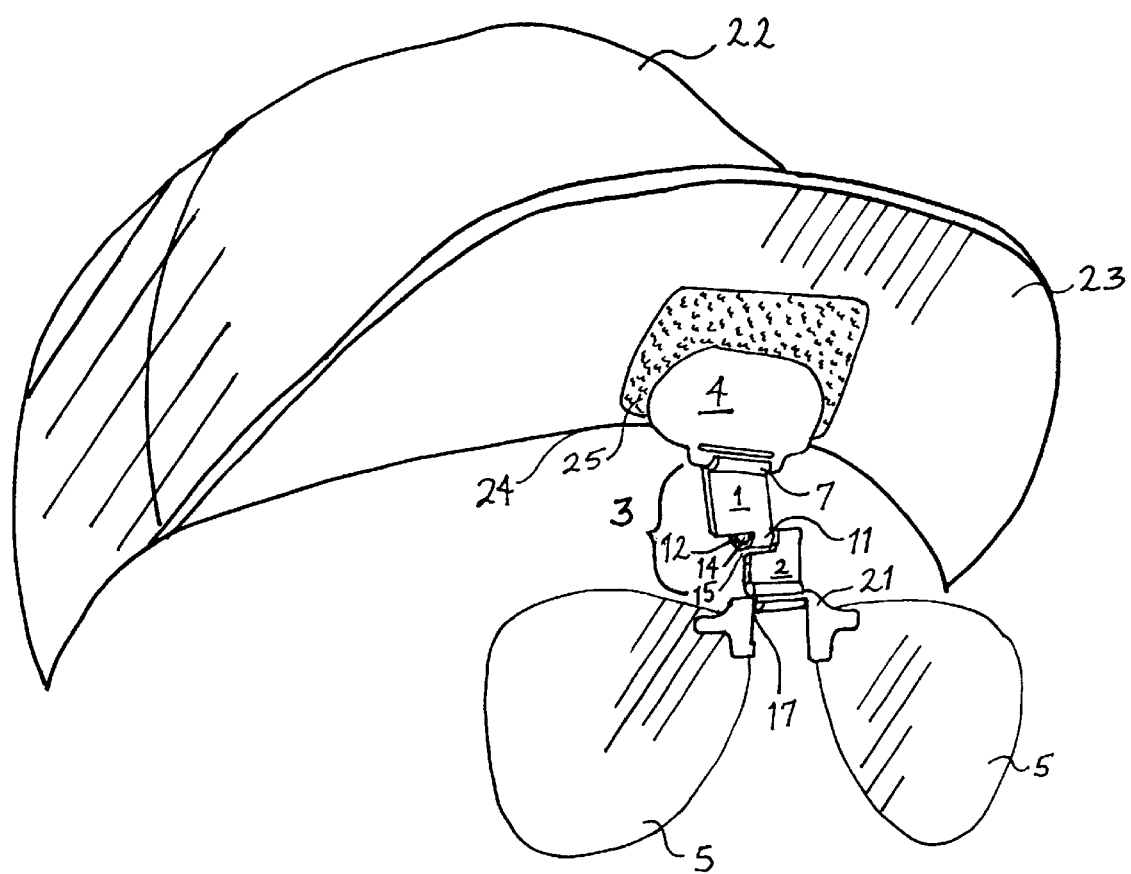

ASSEMBLY FOR ATTACHING SUNGLASSES TO A CAP

BACKGROUND OF THE INVENTION

The field of the invention is assemblies for attaching sunglasses to a cap.

People often wear sunglasses and baseball caps while participating in sports or other outdoor activities. When these are separate items the problem is where to store the sunglasses when they are not needed.

Several types of sunglass and cap combinations are known in the prior art. My U.S. Pat. No. 5,778,448 discloses an assembly for attaching sunglasses to a cap by means of clamps and hinges which fits onto the sides of a cap bill and adjusts for width of cap bills by means of interlocking teeth. Said device also has a pressure clamp onto the lenses which allows the lenses to be flipped up underneath the cap bill when not in use and to be flipped down for use. Other U.S. Patents which disclose sunglasses and cap combinations include U.S. Pat. No. 5,422,686 to Kelman et al. , U.S. Pat. No. 5,261,124 to Day, U.S. Pat. No. 5,615,413 to Bower, U.S. Pat. No. 5,471,259 to Cahill, No. 5,208,916 to Kelman, U.S. Pat. No. 5,491,841 to Valletta, U.S. Pat. No. 5,987,640 to Ryder, U.S. Pat. No. 5,930,834 to Toovey, No. 5,826,271 to Garrett, and U.S. Pat. No. 5,819,318 to Tse. None of the known prior art discloses the combination of features found in the present invention.

SUMMARY OF THE INVENTION

The present invention is an assembly which allows the sunglasses to be removably attached to the underside of the bill or the inside rim of the cap by fastener means, and also allows the position of the sunglasses to be adjusted by means of a two-part hinging device.

An advantage of this arrangement is that the assembly is more readily adjustable.

Another advantage is that the assembly is concealed and not visible on the front or sides of the cap bill.

Another advantage is that the assembly can be removed and remounted on any size cap.

Another advantage is that the sunglass lenses can be readily removed and replaced.

Still another advantage is that the hinging device allows the user to vertically adjust the lenses up or down, or to adjust the lenses to any position the wearer desires.

DESCRIPTION OF THE DRAWING

The FIGURE is a three-quarter front view of the embodiment which has the assembly attached to a fastening means located on the underside of the cap bill. Another embodiment (not shown) has the assembly attached to a fastening means located on the inside rim of the cap, but is otherwise identical to the embodiment shown.

DESCRIPTION OF THE INVENTION

The assembly comprises a flat paddle-like base 4, a pair of sunglass lenses 5, and a two-part hinging device 3 connecting the base 4 to the lenses 5. These parts are all preferably made of plastic, and can be disassembled for easy replacement of parts.

The paddle-shaped base 4 is designed to be concealed either inside the rim 24 of cap 22 or underneath the bill 23 of cap 22. The base 4 is removably attached to the bill 23 or inside rim 24 of cap 22 by a fastening means 25. The fastening means 25 is preferably a hook and loop fastener of the type known by the trademark Velcro, but other types of fastening means could be used, for example, glue, tape, or mechanical fasteners such as rivets.

The hinging device 3 has a first tab-like part 1 and a second tab-like part 2. The top end of the first part 1 fits into a groove 7 at the bottom of base 4 and the first part 1 can be rotated part-way around the axis formed thereby. The first part 1 has formed at its bottom end a projection 11 which defines a tubular opening 12. The top end of the second part 2 has a prong-like projection 14 which defines a slot 15 between itself and the remainder inder of the second part 2. Projection 14 fits into opening 12 and projection 11 fits into slot 15 so that the second part 2 can be rotated part-way around the axis formed thereby. The first part 1 and the second part 2 are aligned off-center with relation to each other. The second part 2 has formed at its bottom end a groove 17 into which the bridge 21 which connects the two lenses 5 fits. The bridge 21 and thus the lenses 5 can be rotated part-way around the axis formed thereby.

The sunglass lenses 5 can be flipped up underneath the bill 23 of the cap 22 when not in use, can be flipped down in front of the wearer's eyes, or can be adjusted vertically, horizontally, or diagonally into any intermediate position.

I claim:

1. An assembly for removably and adjustably attaching sunglasses to a cap, said assembly comprising:

a base attachable to a cap;

a pair of sunglass lenses;

a two-part hinging device connected to said base and to said lenses, said hinging device allowing said lenses to be flipped up underneath the bill of said cap when not in use, to be flipped down for use, or to be adjusted vertically, horizontally, or diagonally into any intermediate position.

2. The assembly of claim 1 wherein said base is flat and generally paddle-shaped.

3. The assembly of claim 1 wherein said base is removably attachable to a fastening means positioned on the inside rim of said cap.

4. The assembly of claim 1 wherein said two-part hinging device comprises a first tab-like part which fits into a groove formed at the bottom end of said base such that said first part is partially rotatable about the axis formed thereby, said first part having formed at its bottom end a projection which defines a generally tubular opening;

and a second tab-like part which has formed at its top end a generally prong-like projection which defines a slot, said projection of said second part fitting into said opening of said first part and said projection of said first part fitting into said slot of said second part such that said second part and said first part are positioned off-center with relation to each other and such that said second part is partially rotatable about the axis formed thereby, said second part having formed at its bottom end a groove which receives a bridge connecting said pair of lenses such that said lenses are partially rotatable about the axis formed thereby.

* * * * *